May 26, 1942.  E. B. VAN ANTWERP  2,284,458
EDUCATIONAL BUILDING SETUP FOR ROUGH PLUMBING
Filed June 22, 1940  2 Sheets-Sheet 1
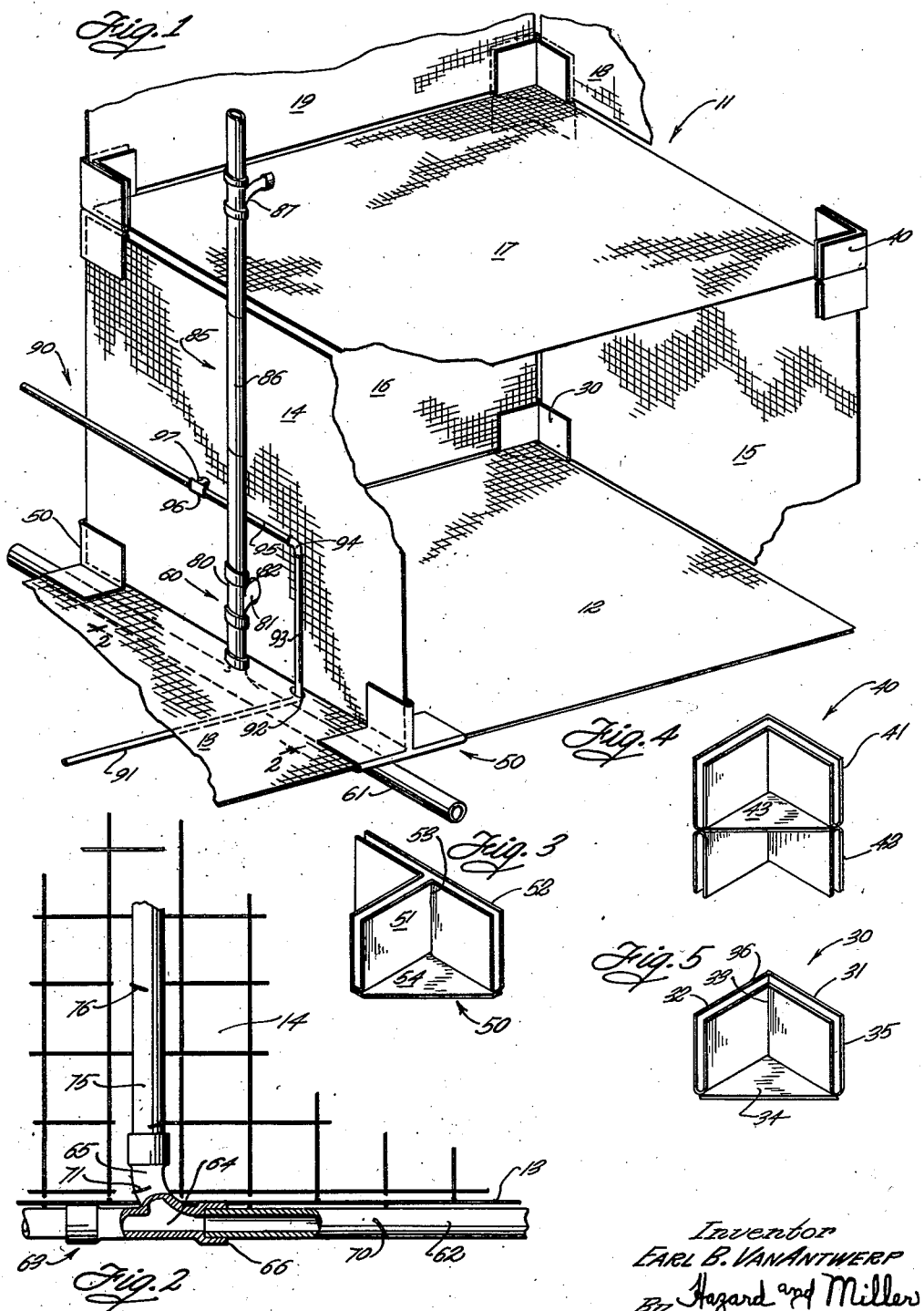
Inventor
EARL B. VAN ANTWERP
By Hazard and Miller
Attorneys

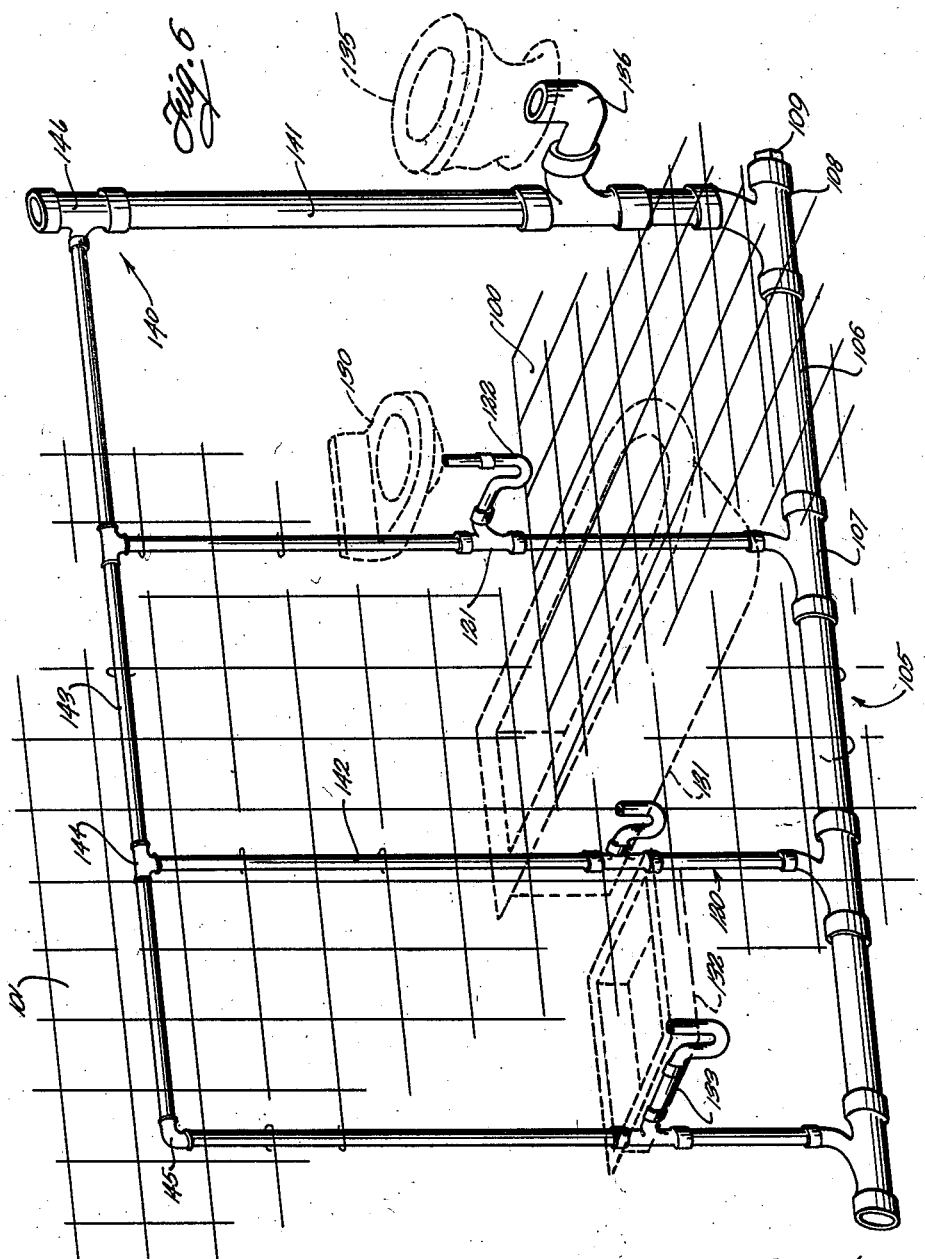

Patented May 26, 1942

2,284,458

UNITED STATES PATENT OFFICE 2,284,458

EDUCATIONAL BUILDING SETUP FOR ROUGH PLUMBING

Earl B. Van Antwerp, Whittier, Calif.

Application June 22, 1940, Serial No. 341,863

2 Claims. (Cl. 35—16)

In education emphasis is being placed on the teaching and instruction in various skilled trades. It is practically necessary to give these teachings in industrial or trade schools in view of the fact that in most trades the old fashioned apprenticeship system of learning has been abolished and even where young employees are regarded as apprentices, they receive practically no training as skilled mechanics except such as they may pick up by observation. One of the difficult skilled trades to teach and even to learn by practical experience is that of plumbing which has all the ramifications from small cottages to large hotels, apartment houses and office buildings. Moreover in learning the plumbing trade, it is necessary for the student to become acquainted with the particular municipal regulations and requirements in the territory where he expects to work.

A main object and feature of my invention is to facilitate education particularly as applied to the building trades and having to do with installations such as plumbing, water service, electric and kindred equipment which enters into buildings quite separate and distinct from the actual structures of the buildings which of course is usually done by skilled mechanics having special lines of work altogether distinct from the art employed on the actual erection or re-modelling of buildings. Another object of my invention is to provide an educational appliance of miniature elements which is of decided use by a skilled artisan in learning how to install novel equipment and also to be of use in making layouts for instance in rough plumbing using the miniature devices, therefore when the miniature is set up satisfactorily the actual full sized work can be done much more rapidly and without error necessitating changes.

Therefore a further object of my invention and illustrated in connection with the installation of plumbing elements and fixtures in miniature involves the simple and ready construction of framings which may simulate the structures of a building such as the walls, partitions, floors, ceilings and etc. This is necessitated as it would be very difficult to give correct instruction in the installation of plumbing even with miniature elements without having some structure with which they are related and to be built in as in a building.

Therefore a further and more detailed object of my invention is the construction of a framing simulating parts at least of a building made of a wire mesh fabric preferably that having relatively large open square mesh type. In this I employ sheets of fabric designated as panels connected at corners and angles by slotted brackets, angles, T's, etc. of this type. Thus with these wire panels and the specially designed brackets, a structure may be readily built up and dismantled giving a sufficient simulation of walls, partitions, floors, ceilings, etc. of a building.

My invention also comprehends the miniature plumbing elements which are made of the same shape as those used in plumbing including straight pipe, elbows of various angles, T's, traps, etc. In order to facilitate the assembly of the different elements, they are preferably provided with dowels or pin and socket connections. Then with the miniature plumbing elements, the rough plumbing may be set up in proper relationship with the wire and mesh panels, the wires of the mesh may be cut and bent to hold the fittings in place and thus the whole assembly is built up as it would be in actual construction. In view of the fact that the wire mesh panels are quite inexpensive, when too many cuts have been made in the individual wires to hold the elements, a panel may be discarded but the miniature fittings may be used over and over again.

My invention is illustrated in connection with the accompanying drawings, in which:

Fig. 1 is a perspective view showing a type of framing of wire mesh fabric illustrative of part of a building construction with certain elements of the rough plumbing and water supply assembled with the framing.

Fig. 2 is an enlarged vertical section on the line 2—2 of Fig. 1 in the direction of the arrows showing part of the plumbing fixtures broken away.

Fig. 3 is a perspective view of a T type of channel bracket.

Fig. 4 is a perspective view of a double channel angle bracket.

Fig. 5 is a perspective view of a single angle channel bracket.

Fig. 6 is a perspective view showing certain wire mesh framing members with rough plumbing connected therewith including certain elements of the finished plumbing shown in dotted lines.

Referring first to Fig. 1, a section of a building is indicated by the numeral 11. This is shown as having a floor panel 12, a second floor panel 13 in substantially the same plane, a side wall panel 14, a second side wall panel 15, a back wall panel 16, a ceiling panel 17 which may be also regarded as a floor panel for a room above. Sections of upper wall panels are indicated at 18 and 19.

These various panels are shown as held in place by various shapes of channel brackets. Each of the panels is indicated as made of wire mesh and preferably of a type having a square or rectangular mesh.

For instance, some of the types of corner or angle brackets are substantially as follows:

A single corner channel bracket 30 is illustrated as having double channels 31 and 32 meeting at the corner 33 and having a connecting triangular web 34 at the base or bottom of the channels. These channels are thus open at a vertical edge 35 and also open at a top edge 36. The brackets when made up are quite substantial.

The bracket of Fig. 4 designated as the double corner channel bracket 40 may be considered as made up of two brackets similar to Fig. 5 having the upper angle channel 41 and the lower angle channel 42, these however being connected by a single web 43. These channels thus have openings on the vertical edges and openings on the horizontal edges facing up and down.

The T type of channel bracket 50, note Fig. 3, has a stem channel 51 intersected by a head channel 52, these meeting at a right angular corner 53. Triangular webs 54 connect the base of the head. For this construction there are therefore two triangular webs. This type of bracket thus has the vertical openings at the ends of the stem 51 and at opposite ends of the head 52 there are also the openings in each channel facing upwardly. It is of course obvious that the type of channel brackets of Figs. 3 or 5 may be used in an inverted, that is, an upside down position when so desired.

Referring to Fig. 4, it will therefore be seen that the floor panels 12 and 13 and the wall panel 14 are held in place by the T bracket 50 at the front and rear, there being two of these types of brackets. The wall panel 13 and the ceiling or floor panel 17 are held in place by the double channel bracket 40 of Fig. 4. This may be fitted at the four corners of the ceiling or floor panel 17, three of these only being illustrated in order to simplify the illustration and expose the interior of the structure. The corner formed by the floor panel 12, the side wall panel 15 and the back wall panel 16 is illustrated as connected in the single bracket 30. This bracket and that immediately above illustrate the horizontal fabric resting on a triangular web. It will be seen that merely by employing brackets such as shown in Figs. 3, 4 and 5 or a further similar type that a large variety of shapes and sizes of panels may be built up and held sufficiently rigid for the purpose of developing a framing with approximately the characteristics of a building construction in which the plumbing is to be installed. In view of the fact that each of the panels is made up of a wire mesh fabric, the individual wires may be designated as strands. The particular structure of these wire fabrics is no part of my invention as there are satisfactory types now on the market which may be purchased in large sheets at quite moderate prices and cut into the desired shapes and sizes.

The manner of using the fabricated structure made of the panels above mentioned for rough plumbing is indicated by the rough plumbing installation 60. Referring to Figs. 1 and 2, this shows a sloping run of drain pipe 61 located as indicated, below the floor panel 13, thus this may be considered either as underneath the ground floor of a house or underneath a cellar floor where the drain pipe is buried in the ground. This pipe is made up of straight pipe sections 62, a type of curved elbow T 63 is also illustrated, this latter having the head section 64 and a curved stem section 65. In constructing these miniatures I prefer to make them simulating as close as possible without undue cost to manufacture, the actual plumbing fixtures, therefore at each end of the T there is shown a bell and spigot type of joint 66 but of course as no water is to run through these miniature pipes they may be made solid and the bell and spigot may be considered as a socket and dowel pin connection.

This installation of the drain pipe shows the manner in which the fabric is utilized to attach the various elements. For instance the floor panel 13 is shown as having certain of the strands 70 cut and bent to grip the horizontal section of pipe. The lower portion of the wall panel 14 is indicated as having a strand cut and bent at 71 to engage the stem 65 of the T 63. Additionally a section of standpipe 75 rises from the T and is likewise gripped by cut and bent strands 76 of the wall panel 14. A second T 80 is illustrated as having the stem 81 extending through an opening 82 in the vertical wall 14. If the open space of the mesh fabric is of insufficient size, one or more strands may be cut to afford the proper opening and also to locate such opening in the proper position. The strands cut in forming this opening may be utilized to secure the T in place.

A vent pipe construction 85 is shown by a series of vent pipe sections 86 leading upwardly from the drain pipe and from the T 80. This extends above the top of the wall panel 14 above the ceiling or floor panel 17 and may have another T fitting 87.

In Fig. 1 I also illustrate in a conventional manner a water supply installation 90. This is indicated as having a main supply pipe 91 presumed to lead from the water main, this passing underneath the panel 13 and upwardly through an opening 92. A vertical section 93 is placed contiguous to the outside of the wall 14, an elbow 94 connected to the vertical pipe 93 has a horizontal pipe run 95 connected thereto. A T 96 is connected to this run and has its stem passing through an opening 97 in the panel 14. This water pipe and its various necessary fittings is likewise attached to the fabric panels by cutting strands and bending these to engage the pipe.

Fig. 6 illustrates a series of plumbing fittings connected with floor and wall panels together with various finished plumbing elements shown in dotted lines. For sake of completeness of the illustration of Fig. 6, a fabric floor panel is indicated by the numeral 100 and a vertical wall panel by the numeral 101, each of these being of the rectangular wire mesh. Underneath the floor panel is a line of drainage pipe 105, this being built up of a series of straight pipe sections 106 and a series of T's 107. The end T 108 is shown as having a removable clean-out plug 109. The floor and wall panels both have strands cut and bent to hold the drain pipe and the various T's in position.

Extending upwardly from the various T's there are a series of standpipes 120, each of which has an elbow 121 attached thereto. From certain of these elbows are connected traps such as 122, this depending on the type of finished fitting to which the connection is made. For instance the direct connected traps are indicated as connected to a wash basin 130, a bathtub 131. A shower bath tray indicated at 132 necessitates a connecting pipe 133 to the trap. As the water closets 135 usually have a trap built therein, an elbow 136 makes a connection to a vertical T which in its turn leads to the drain pipe system.

The vent connection or systems 140 are shown as having a main riser 141 from the water closet pipe system and secondary vent risers 142 leading upwardly from the T's connecting to the various fittings such as the wash basin 130, the bath 131, and the shower bath tray 132. A horizontal vent pipe run 143 connects into the vertical secondary vent pipes as for instance by T's 144, an elbow 145 and these in turn connect to the main vent standpipes 140 by a T 146. All of these sides and connecting elements are made in miniature having a suitable bell and spigot connection or a socket and dowel attachment. Where special fittings are used with an adjustable collar, these may also be installed in the miniature plumbing system. The wire fabric of the panels affords a structure for holding the assembly in place by slitting strands and bending these to engage various elements of the construction. It will therefore be seen that after the assembly has been completed, it is held in place in proper relationship to the various panels but may be readily disconnected for making changes or rearrangement to secure a better set-up of the whole plumbing scheme. It is obvious that in these miniature structures such as in Fig. 6 the water supply of both hot and cold water may be likewise built in place similar to the water supply connections 90 of Fig. 1 and held in proper position on the panels and in relation to the various fixtures. Where desired miniatures of the fixtures may also be utilized such as the wash basin 130, the bath 131, the shower tray 132 and the water closet 135, however for sake of clarity of illustration, these have been shown dotted instead of in full lines.

My invention as above mentioned comprehends not only the use of miniature elements of construction used in plumbing such as the sewerage or drainage system, the vent system, but also the water supply. Further, my invention includes the use of miniature devices and fittings for other common services in building construction such as the gas pipe connections with their various elements, the electrical installation including conduits, switch-boxes, wall box connections and other similar structures of a type coming under the general head of electrical wiring for houses or building constructions.

Various changes may be made in the details of the construction without departing from the spirit or scope of the invention as defined by the appended claims.

I claim:

1. A device of the class described comprising a plurality of panels, means for detachably fastening the panels together to represent the floor, walls, and ceiling of a building, a plurality of detachably connected miniature service fittings adapted to be applied to the structure to represent service fittings of a building, the panels being formed of crossed wire strands of sufficiently wide mesh that when a strand is cut adjacent its crossing another strand the freed portion of the strand which is freed by the cutting is sufficient in length to partially encircle a service fitting to hold the fitting against the panel from which the strand is cut.

2. In a device of the class described a plurality of panels adapted to be assembled to form a floor, walls, and ceiling representative of the floor, walls, and ceiling of a building, and brackets for holding the panels in assembled relationship, each bracket comprising at least two panels arranged at an angle to each other and designed to receive corner portions of wall-forming panels, each bracket having corner webs connecting the panels adapted to support floor or ceiling-forming panels.

EARL B. VAN ANTWERP.